United States Patent [19]
Sahm et al.

[11] Patent Number: 5,794,917
[45] Date of Patent: Aug. 18, 1998

[54] COOLANT VALVE FOR A TOOL TURRET

[75] Inventors: Detlef Dieter Sahm, Reichenbach; Rolf Wezel, Metzingen, both of Germany

[73] Assignee: Sauter Feinmechanik GmbH, Metzingen, Germany

[21] Appl. No.: 637,282

[22] Filed: Apr. 24, 1996

[30] Foreign Application Priority Data

May 9, 1995 [DE] Germany .................. 195 16 980.9

[51] Int. Cl.$^6$ ............... F16K 3/02; B23B 29/24; B23Q 11/10
[52] U.S. Cl. .................. 251/176; 137/625.11
[58] Field of Search ................ 251/175, 176, 251/343, 344; 137/625.11, 242

[56] References Cited

U.S. PATENT DOCUMENTS

| | | | |
|---|---|---|---|
| 3,917,220 | 11/1975 | Gilmore | 251/176 |
| 3,966,235 | 6/1976 | Lewis | 251/176 |
| 4,632,148 | 12/1986 | Stark et al. | 137/625.11 |
| 4,641,685 | 2/1987 | Rudelick | 251/176 |

FOREIGN PATENT DOCUMENTS

| | | |
|---|---|---|
| 3545266 | 7/1987 | Germany . |
| 4018543 | 8/1991 | Germany . |

Primary Examiner—Marguerite McMahon
Attorney, Agent, or Firm—Roylance, Abrams, Berdo & Goodman, L.L.P.

[57] ABSTRACT

A valve is placed between two relatively movable parts, especially to control coolant flow in a tool turret. One part has a valve housing and a movable valve body within valve housing. The valve body has a sealing surface and a discharge opening, opening into the sealing surface. The other part has a valve seat with a seat surface and a valve passage opening into the seat surface. At least a portion of the area of the sealing surface lying adjacent to the discharge opening in the direction of movement of the two parts is of greater dimensions than the diameter of the valve passage. The valve has a wiper.

18 Claims, 1 Drawing Sheet

5,794,917

COOLANT VALVE FOR A TOOL TURRET

FIELD OF THE INVENTION

The present invention relates to a valve between two parts which are movable relative to one another, especially a coolant valve for a tool turret.

BACKGROUND OF THE INVENTION

A known valve for coolant in a tool turret is located between the stationary part of the tool turret and the tool face. When the tool face is in a work setting, the valve transfers the coolant required to cool the tools. The valve interrupts the coolant feed during rotation or pivoting of the tool face. For this purpose the valve includes a valve housing in the stationary part of the tool turret. A movable valve body with a discharge opening is provided in the valve housing. An attachment to the tool face or the tool face itself is configured as a valve seat with a valve passage for each work setting of the tool face.

In each work setting the valve body is aligned with a valve passage. The mouth area of the discharge opening of the valve body and the mouth area of the valve passage of the valve seat are configured as sealing or seat surfaces. A spring propped in the valve housing biases the valve body against the valve seat, so that the sealing surface and the seat surface come at least partially into contact with one another. Upon rotation of the tool face the valve seat is thrust along in the plane of the seat surface until the valve body is aligned with the next valve passage.

In practice, contaminants can easily get between the sealing surfaces of the valve body and the seat surface with this thrusting process. Thus, the valve is not completely sealed. Furthermore, the valve body is subject to considerable wear as a result of the presence of these contaminates or particles.

SUMMARY OF THE INVENTION

Objects of the present invention are to provide an improved valve operating between two parts which are movable relative to one another.

The foregoing objects are basically obtained by a valve for use between relatively movable first and second parts. The first part has a valve housing, and the second part has a valve seat. A valve body is movably mounted in the valve housing, and has a sealing surface and a discharge opening in the sealing surface. The sealing surface has an area portion adjacent the discharge opening in a direction of movement of the first part relative to the second part. The area portion has first dimensions. A wiper is coupled to the valve housing. The valve seat has a seat surface and a valve passage opening on the seat surface. The valve passage has a second diameter. The first dimensions are greater than the second diameter.

Because the valve incorporates a wiper, fewer contaminants get between the sealing surface and the seat surface during relative movement of the two parts. Since the sealing surface area, at least in a portion of the surface area adjacent to the discharge opening in the direction of movement of the two parts is of larger dimensions than the diameter of the valve passage, a tighter sealing of the valve passage is obtained during the movement of the two parts. At the same time, less wear occurs.

The valve is configured especially as coolant medium valve for tool turrets. However, the valve can also be used for other pressure-driven media in other devices.

If the discharge opening in the valve body is configured as a nozzle, large coolant medium volumes can be transferred at higher pressures in the conduit system of the tool face in comparison with known valves. This is especially advantageous for internally cooled tools, in other words those tools which have a coolant passage in the center and must be supplied with coolant reaching as far as their pivot points or working parts.

Preferably, the wiper is provided in the valve housing and is movable relative to the housing and to the valve body.

If the valve body is arranged within the wiper and the wiper encircles the valve body, the wiper can advantageously hold back contaminants from the valve body, whatever the direction of rotation of the tool face.

Spring biasing of the wiper and the valve body is advantageous even when there is only low static pressure in the valve, in other words when there is considerable coolant flowthrough. The sealing and seat surfaces engage effectively with one another.

It is advantageous to provide an auxiliary chamber between the valve body and the wiper. The auxiliary chamber is connected with the interior chamber of the valve through a flow-throttling connection. This connection causes reactions to the pressure variations in the interior chamber of the valve only after some delay. With such an auxiliary chamber the impacting pressure force of wiper and valve body can be set differently.

Manufacture of the wiper of a hard material is advantageous to increase the life of the wiper, as the wiper is the structural part with the highest wear.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which forms a part of this disclosure.

DETAILED DESCRIPTION OF THE INVENTION

Figure 1:
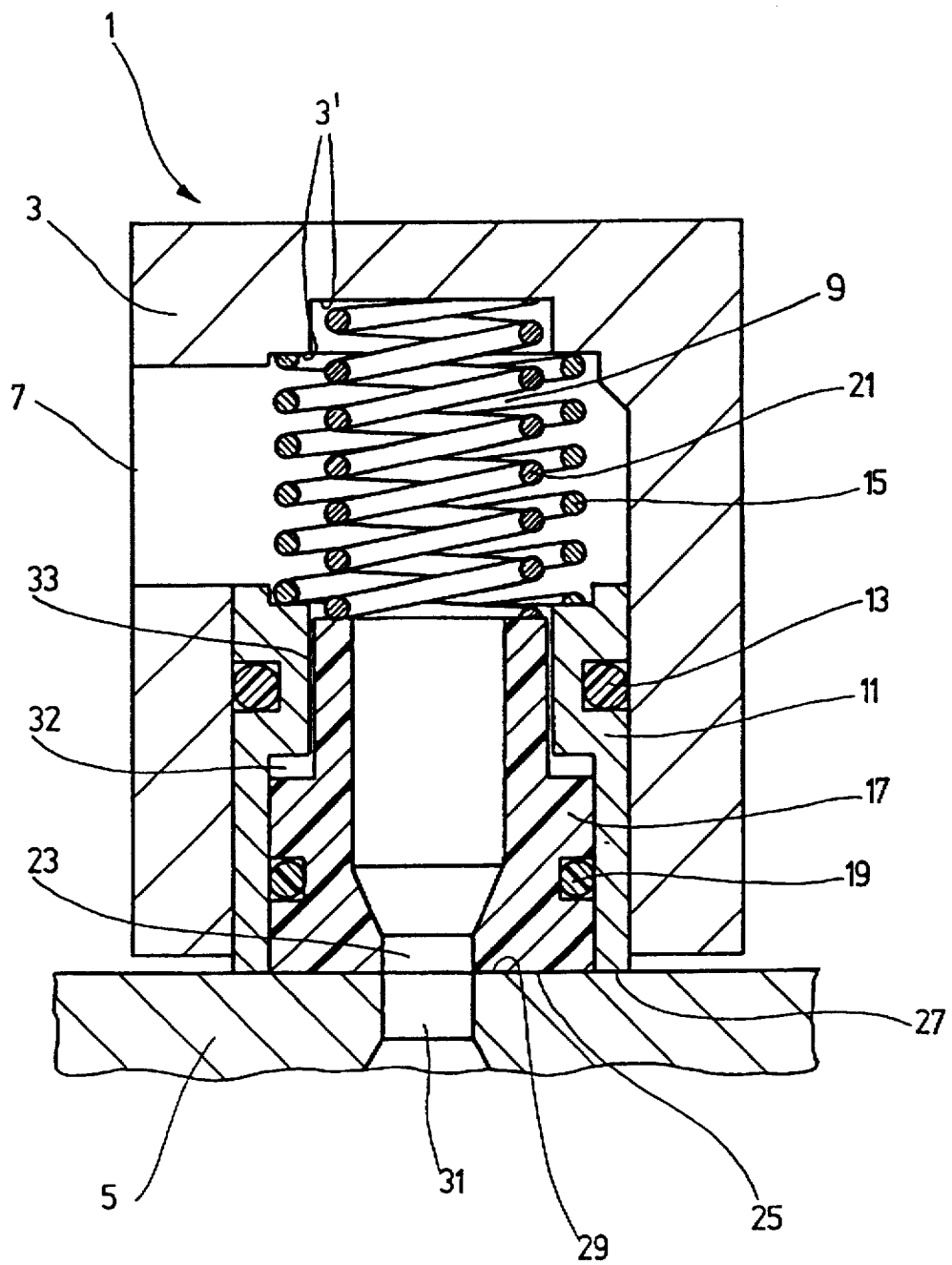
FIG. 1 is a side elevational view in section of a valve according to an embodiment of the present invention.

The illustrated embodiment shows a valve, indicated in its entirety as 1, serving as coolant valve between the stationary part of a tool turret and the tool face. The tool face is movable relative to this stationary part.

The stationary part of the tool turret includes a cylindrical valve housing 3, preferably manufactured of aluminum. The stationary part of the tool turret can also be configured directly as valve housing 3. The longitudinal alignment of valve housing 3 is indicated hereinafter as being in the axial direction or valve axis. This axial alignment extends parallel with the rotary axis of the tool face.

On one of the two interface or surface sides extending perpendicular to the valve axis, valve housing 3 is open. At this open working side, valve housing 3 can be aligned with valve seat 5. In the illustrated embodiment, the valve seat is a part of the tool face movable relative to the stationary part of the tool turret.

Valve housing 3 has an inlet opening 7 in its cover portion. Coolant enters through inlet opening 7 and is conveyed into interior chamber 9 of housing 3. Interior chamber 9 is of approximately cylindrical shape, oriented in axial alignment with valve housing 3. At the end of interior chamber 9 remote from valve seat 5, valve housing 3 has a supporting surface 3' extending transverse to the valve axis. The supporting surface is provided with a step.

An essentially hollow cylindrical wiper or stripper 11 is arranged in valve housing 3. The wiper is axially movable relative to valve housing 3 and is guided for the most part on the interior surface of valve housing 3 bordering interior chamber 9. A first sealing ring or gasket 13 provides a seal between wiper 11 and the interior surface of valve housing 3. A first impact pressure spring 15 engages at one end thereof on the step of supporting surface 3' and at its other end on wiper 11. By means of spring 15, wiper 11 is biased axially against valve seat 5. Wiper 11 is manufactured of a hard material, for example of bronze.

Another component part of valve 1 is a hollow valve body 17 which is axially movable within valve housing 3. Valve body 17 is preferably manufactured of a wear-resistant material, is arranged within wiper 11 and is axially movable relative to the wiper. The shape of valve body 17 enables the valve body to be guided on the interior covering surface of wiper 11. Valve body 17 and wiper 11 are sealed relative to one another by means of a second sealing ring or gasket 19. A second impact pressure spring 21 engages at one end thereof on supporting surface 3' and at its other end on valve body 17. By means of spring 21, valve body 17 is biased against valve seat 5.

On the working interface or outer surface of valve body 17 facing valve seat 5, the valve body has a discharge opening 23 in the form of a nozzle tapered toward the interface surface of valve body 17. Since both wiper 11 and valve body 17 are open on their interfaces remote from valve seat 5, discharge opening 23 is directly connected in fluid communication with interior chamber 9. The interface or surface of valve body 17 facing valve seat 5 is configured as sealing surface 25. The corresponding interface or surface of wiper 11 is configured as another sealing surface 27 which can be a coplaner extension of sealing surface 25.

The surface of valve seat 5 facing wiper 11 and valve body 17 is configured as seat surface 29. A seat surface 29 is provided for each work setting of the tool face. When the tool face is in a work setting, valve seat 5 is stationary relative to valve housing 3, and sealing surface 25 and the other sealing surface 27 engage seat surface 29 in a sealed manner.

A valve passage 31 opens in each seat surface 29. Valve passage 31 is of the same diameter as discharge opening 23 of valve body 17 in the plane of seat surface 29. Thus, the valve passage can be configured as a nozzle. In each work setting of the tool face, discharge opening 23 is aligned with a valve passage 31.

Between wiper 11 and valve body 17 an annular auxiliary chamber 32 is coaxially located within valve housing 3. The inside interface or surface of the auxiliary chamber proximate to valve seat 5 is limited by valve body 17. The outside interface or surface of the auxiliary chamber remote from valve seat 5 is limited by wiper 11. Auxiliary chamber 32 is connected through a connecting chamber 33 with interior chamber 9. The cross-sectional surface area of connecting chamber 33 is defined by the play or radial clearance between wiper 11 and valve body 17. The cross-sectional surface area between auxiliary chamber 32 and interior chamber 9 is so small that coolant from interior chamber 9 can flow only slowly into auxiliary chamber 32, and vice versa. Thus, that flow is throttled.

Valve 1 is open in each work setting of the tool face. Sealing surface 25 of valve body 17 and sealing surface 27 of wiper 11 sealingly engage seat surface 29 of valve seat 5. From a coolant conduit (not shown in the drawing), the coolant flows from a pump (not shown) out of the stationary part of tool turret through inlet opening 7 into interior chamber 9 of valve housing 3. The coolant pressure is $p_o$ at inlet opening 7. From interior chamber 9, the coolant passes through wiper 11 which is open on the interface side and through hollow valve body 17 to discharge opening 23 of valve body 17. The coolant exiting discharge opening 23 passes into valve passage 31 of valve seat 5. From valve passage 31, the coolant passes into a passage (not shown in the drawing) leading to the tool.

First impact pressure spring 15 and second impact pressure spring 21 engage ends of wiper 11 and of valve body 17, respectively, proximate to interior chamber 9. In addition, the dynamic pressure of the flowing coolant and the static pressure work or operate on wiper 11 and valve body 17. The static pressure $P_1$ is lower, by the dynamic pressure, than the pressure $p_o$ at inlet opening 7. Likewise, the static pressure $p_1$ works or operates in auxiliary chamber 32, as soon as a balance of pressure is reached with interior chamber 9.

When the tool face is shifted from one work setting to another work setting, valve seat 5 moves transverse to the axis of valve 1 and relative to valve housing 3. Valve passage 31 reaches the part of sealing surface 25 adjacent to discharge opening 23. Since this part of sealing surface 25 is of greater dimensions than the diameter of valve passage 31, sealing surface 25 seals valve passage 31 closed and thereby prevents overflow of the coolant into the environment of the tool turret as in conventional valves. At the same time, the seat surface 29 located next to valve passage 31 closes discharge passage 23 of valve body 17. The coolant flow is thus interrupted.

At the interfaces or surfaces of valve body 17 and wiper 11 in interior chamber 9, the static pressure rises from $p_1$ to $p_o$. In auxiliary chamber 32, because of the throttled connection to interior chamber 9 through connecting chamber 33, the static pressure remains at $p_1$ for the time being. Compared to the state when valve 1 is open, wiper 11 is pressed against seat surface 29 with a force which is increased by the value of the product of $(P_o-p_1)$ and the dimensions of the interface or surface of wiper 11 facing interior chamber 9. With this higher force during movement of the tool face, contaminants are more positively held back by wiper 11. The force working on valve body 17 is increased correspondingly to the product of $(P_o-p_1)$ and the dimensions of the interface surface of valve body 17 facing interior chamber 9. Since this interface surface however is smaller in comparison with the interface surface of wiper 11 and only the pressure $p_1$ works on valve body 17 along the limiting surface of auxiliary chamber 32, the amplification of the force which works on valve body 17 is smaller than the amplification of the force which works on wiper 11. Because of the smaller force exerted on valve body 17, this valve part is less burdened than wiper 11. Because of the very low coolant flow through connecting chamber 33, the static pressure in auxiliary chamber 32 rises only gradually to the value $p_o$. This leads to lessening of the force exerted on wiper 11, and an increase of the force exerted on valve body 17.

As soon as the next valve passage 31 gets into the range of discharge opening 23, coolant again flows through valve 1. Since a greater static pressure is now being generated in auxiliary chamber 32 than in interior chamber 9, sealing surface 25 presses more forcefully against seat surface 29. This greater force does not lead to greater wear, since seat surface 29 was freed of contaminants beforehand by wiper 11. The balance of static pressure in auxiliary chamber 32 is then reached again through connecting chamber 33.

In another embodiment, the valve can be configured without any auxiliary chamber and without a movable wiper. Furthermore, the present invention is not limited to a flat sealing surface and a flat seat surface. For example, cylindrically curved sealing and seat surfaces are also conceivable. The valve according to the present invention is also not limited to coolant valves for tool turrets. It can be used between any two parts which are movable relative to one another where pressure-controlled medium must be transferred and where this transfer of medium is to be interrupted from time to time. This arrangement could conceivably be used for multiple-way valves, single control mixers, automatic discharge devices or turf throwers.

While a particular embodiment has been chosen to illustrate the invention, it will be understood by those skilled in the art that various changes and modifications can be made therein without departing from the scope of the invention as defined in the appended claims.

What is claimed is:

1. A valve for use between relatively movable first and second parts, comprising:

a valve housing provided on said first part;

a valve body movably mounted in said valve housing, said valve body having a sealing surface and a discharge opening in said sealing surface, said sealing surface having an area portion adjacent said discharge opening in a direction of movement of the first and second parts relative to one another, said area portion having a first dimension in said direction on each side of said discharge opening;

a wiper coupled to said valve housing; and a valve seat provided on said second part, said valve seat having a seat surface and a valve passage opening on said seat surface, said valve passage having a diameter, each said first dimension being greater than said diameter.

2. A valve according to claim 1 wherein said discharge opening of said valve body comprises a nozzle.

3. A valve according to claim 1 wherein said wiper is movably mounted in said valve housing relative to said valve housing and to said valve body.

4. A valve according to claim 3 wherein said valve body is located in said wiper; and said wiper surrounds said valve body.

5. A valve according to claim 4 wherein first and second springs bias said wiper and said valve body, respectively, against said valve seat.

6. A valve according to claim 3 wherein first and second springs bias said wiper and said valve body, respectively, against said valve seat.

7. A valve according to claim 1 wherein said valve housing comprises an interior chamber on sides of said wiper and said valve body remote from said sealing surface;

an auxiliary chamber is provided between said wiper and said valve body; and a flow-throttling connection couples said interior chamber and said auxiliary chamber in fluid communication.

8. A valve according to claim 1 wherein said wiper is manufactured of hard material; and said valve body is manufactured of wear-resistant material.

9. A valve according to claim 1 wherein the first and second parts are portions of a tool turret.

10. A valve according to claim 1 wherein said housing and said valve body have longitudinal axes transverse to said direction, said valve body being movable along said longitudinal axes.

11. A valve according to claim 1 wherein the first and second parts are portions of a tool turret.

12. A valve for use between relatively movable first and second parts, comprising:

a valve housing provided on said first part and having an interior chamber;

a valve body movably mounted in said valve housing, said valve body having a sealing surface and a discharge opening in said sealing surface, said sealing surface having an area portion adjacent said discharge opening in a direction of movement of the first and second parts relative to one another, said area portion having a first dimension;

a wiper coupled to said valve housing, said interior chamber being on sides of said wiper and said valve body remote from said sealing surface;

a valve seat provided on said second part, said valve seat having a seat surface and a valve passage opening on said seat surface, said valve passage having a diameter, said first dimension being greater than said diameter;

an auxiliary chamber between said wiper and said valve body; and a flow-throttling connection coupling said interior chamber and said auxiliary chamber in fluid communication.

13. A valve according to claim 12 wherein said discharge opening of said valve body comprises a nozzle.

14. A valve according to claim 12 wherein said wiper is movably mounted in said valve housing relative to said valve housing and to said valve body.

15. A valve according to claim 14 wherein said valve body is located in said wiper; and said wiper surrounds said valve body.

16. A valve according to claim 15 wherein first and second springs bias said wiper and said valve body, respectively, against said valve seat.

17. A valve according to claim 14 wherein first and second springs bias said wiper and said valve body, respectively, against said valve seat.

18. A valve according to claim 12 wherein said wiper is manufactured of hard material; and said valve body is manufactured of wear-resistant material.

* * * * *